Figure 3:
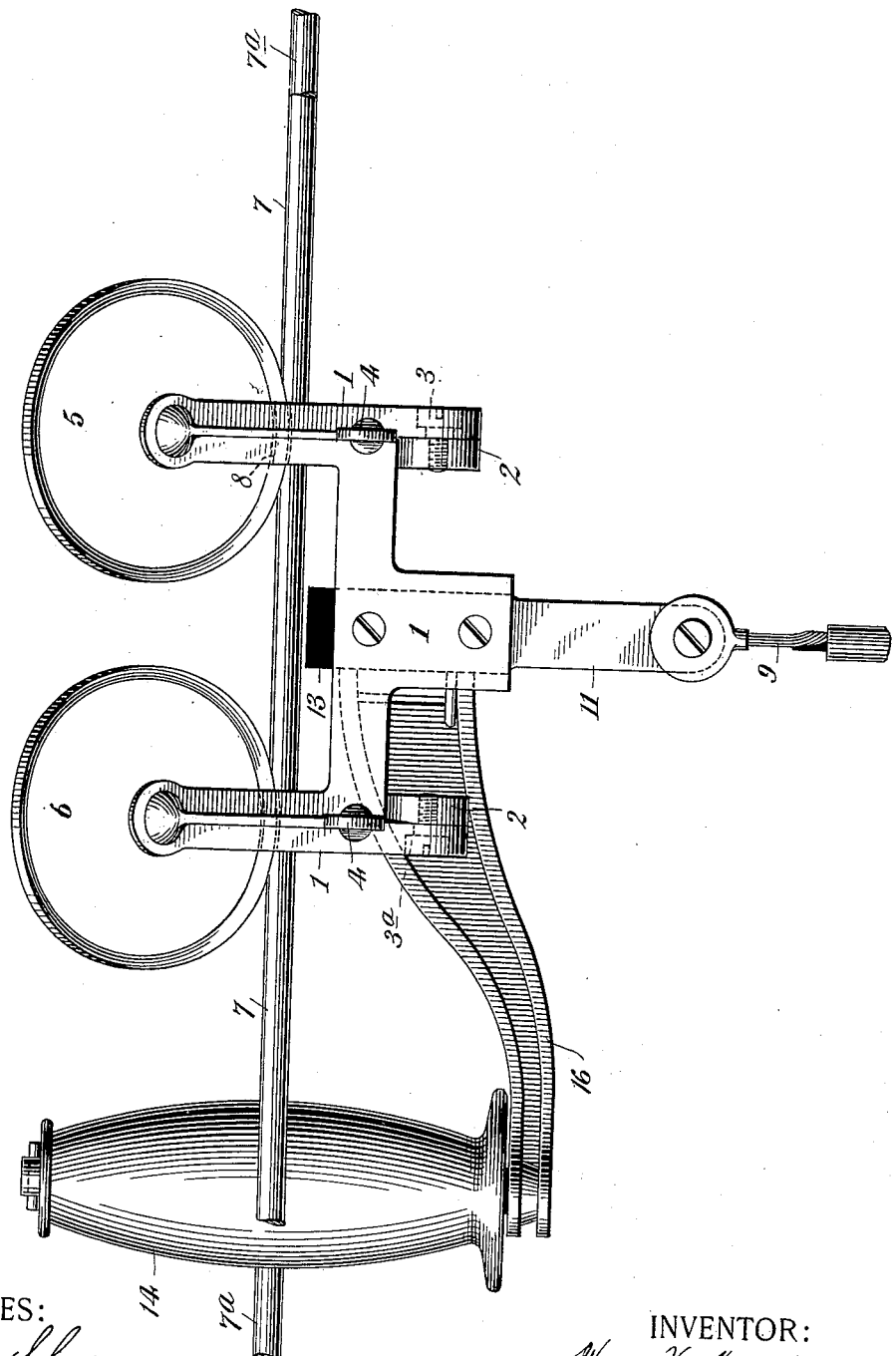

No. 607,387. Patented July 12, 1898.
H. VAN HOEVENBERGH.
TROLLEY FOR ELECTRIC RAILWAYS.
(Application filed Aug. 31, 1897.)
(No Model.) 2 Sheets—Sheet 1.
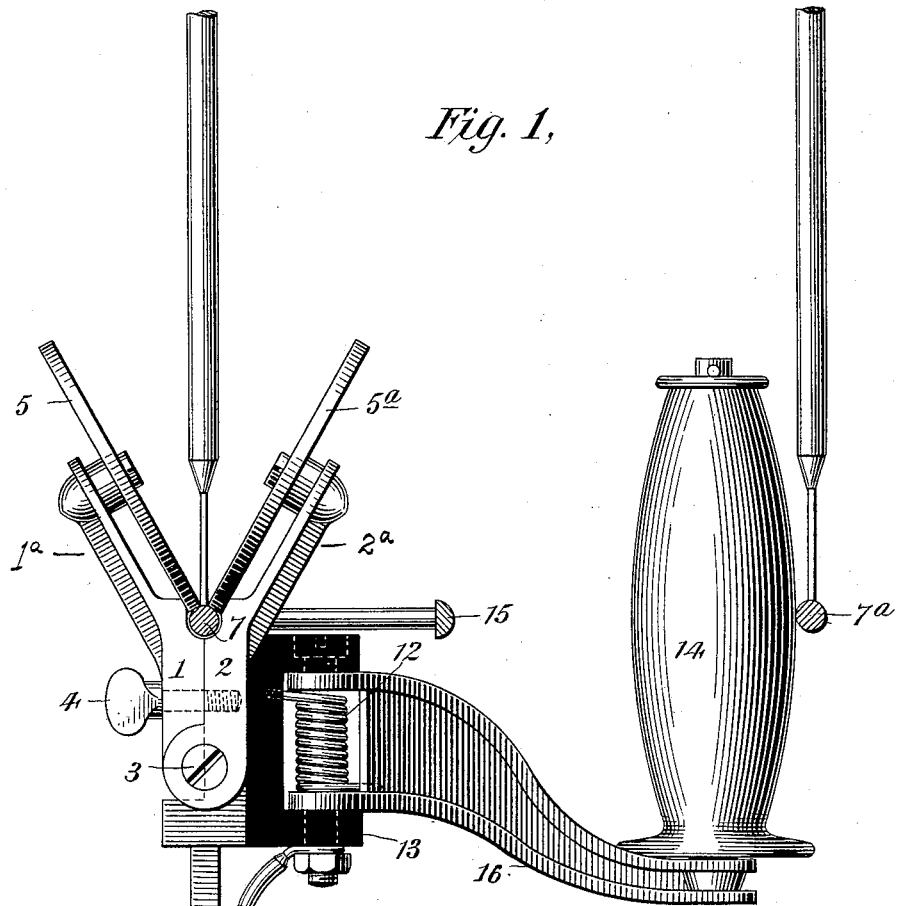
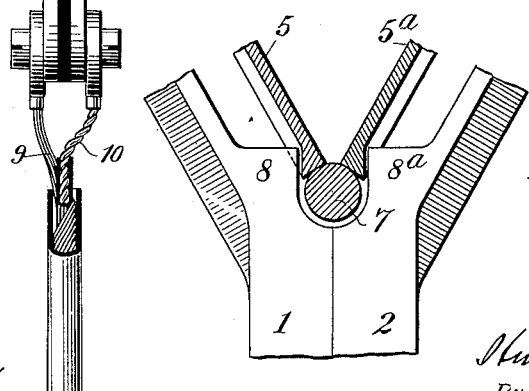
WITNESSES:
C. E. Ashley
H. W. Lloyd
INVENTOR:
Henry Van Hoevenbergh
By his Attorney No. 607,387. Patented July 12, 1898.
H. VAN HOEVENBERGH.
TROLLEY FOR ELECTRIC RAILWAYS.
(Application filed Aug. 31, 1897.)

(No Model.) 2 Sheets—Sheet 2.

WITNESSES:
C. E. Ashley
H. W. Lloyd

INVENTOR:
Henry Van Hoevenbergh
By his Attorney

UNITED STATES PATENT OFFICE.

HENRY VAN HOEVENBERGH, OF NEW YORK, N. Y.

TROLLEY FOR ELECTRIC RAILWAYS.

SPECIFICATION forming part of Letters Patent No. 607,387, dated July 12, 1898.

Application filed August 31, 1897. Serial No. 650,146. (No model.)

*To all whom it may concern:*

Be it known that I, HENRY VAN HOEVENBERGH, a citizen of the United States, and a resident of New York, county of New York, and State of New York, have invented certain new and useful Improvements in Trolleys for Electric Railways, of which the following is a specification.

This invention relates to trolleys for collecting current from supply-conductors and leading the same to electrically-propelled vehicles. The device is particularly adapted for service with motor carriages, stages, or other vehicles adapted to run on roadways not provided with railway-tracks of the kind described in a prior application filed by me November 20, 1896, Serial No. 612,803. In my prior application just referred to are described trolleys provided with grooved wheels rolling upon one conductor.

My present invention is adapted to employ wheels having a plane or ungrooved periphery.

In carrying out the invention I journal the wheels upon a forked frame the two arms of which are pivotally connected and adapted to be secured together or released for spreading apart by a thumb-screw, the two arms of the fork being adapted to partially inclose a supply-conductor, the trolley-wheels overlapping projections of the forked arms and also bearing upon the supply-conductor. A pivoted elastically-yielding arm carrying a roller is mounted upon, but insulated from, the frame and is adapted to make connections with a companion supply-conductor. Flexible wires lead from the frame and the insulated arm to the vehicle. By this organization the trolley is securely locked to the supply-conductor upon which it rolls.

The several features of novelty of my invention will hereinafter be more fully pointed out, and will be definitely indicated in the claims appended to this specification.

In the accompanying drawings, which illustrate the invention, Figure 1 is an end elevation, part in section, of a trolley embodying my improvements. Fig. 2 illustrates, on an enlarged scale, part of a trolley-frame, the wheels and conductor being shown in section to better illustrate their coöperative relation to the frame. Fig. 3 is a side elevation of the trolley.

1 2 $1^a$ $2^a$ represent four arms of an iron or steel frame pivotally connected at 3 $3^a$ and adapted to be locked together or disconnected by a thumb-screw 4. The arms fork at a point intermediate their extremities and carry at the upper ends journaled wheels 5 $5^a$ 6 $6^a$. The wheels are provided with flat or ungrooved peripheries adapted to roll upon the upper side of a supply-conductor 7. The arms of the frame are provided with bosses or projections 8 $8^a$, (see Fig. 2,) which overlap the outer sides, as indicated in Fig. 2. It will be evident that when the thumb-screw 4 is adjusted to lock together the arms of the frame around the conductor there will be no possibility of the trolley becoming detached from the conductor unless some of the parts should break, since the frame and wheels inclose almost the entire surface of the supply-conductor, and the wheels are effectually prevented from spreading by the bosses on the frame. The frame is electrically connected by one of the flexible conductors or leads 9 to the traveling vehicle, the return-conductor from the vehicle 10 connecting with an insulated metallic strip mounted on a downwardly-extending projection 11 of the frame. The insulated strip connects with a pivot mounted in a block of insulating material 13, which supports an elastically-yielding arm controlled by a spiral spring 12, wound around the pivot to bear upon and engage the block 13 and the web of the arm, respectively. The extremity of the arm carries a light tubular roller 14 of considerable length, which roller is adapted to engage a companion conductor $7^a$, which forms a return-path for the current, the supply system being a round metallic circuit. A metallic rail 15, electrically connected with the frame of the trolley, acts as a guide for the roller 14 of an oppositely-moving trolley, which travels on the companion wire, thus serving to maintain a continuity of supply of current to two passing vehicles. This construction, however, forms no part of my invention and has been described and claimed in my prior application hereinbefore referred to.

My present improvements relate to the trolley frame and wheels. The construction here described is particularly advantageous for service upon supply-wires which have many or sharp turns. The collector-wheels, being plane on the periphery, easily follow the curves without losing their grip on the wire, and the forward wheels may follow a sharp turn without danger of leaving the wire, being prevented from accidental detachment by the projections of the frame. Thus if by reason of a pull or sudden jerk the wheels are strained they are brought against the abutting projections of the frame and are not permitted to spread sufficiently to allow the conductor to pass between them.

Having thus described my invention, what I claim as new, and desire to secure by Letters Patent, is—

1. A trolley provided with a plurality of wheels set at an angle to bear upon a supply-conductor at their peripheries, said wheels being mounted in a frame provided with projections lying close to their sides to prevent spreading.

2. A trolley provided with a plurality of wheels having ungrooved peripheries, said wheels being set at an angle to one another to engage a supply-conductor, a frame in which the wheels are mounted having projections to limit the tendency of the wheels to spread, and a wall inclosing part of the conductor at or near a point opposite the bearing-point of the wheels.

3. A trolley provided with a plurality of wheels lying at an angle to embrace one side of a supply-conductor, a pivoted frame in which said wheels are journaled, an inclosing wall formed in the frame for a part of the conductor opposite the bearing-point of the wheels, and means for locking the frame upon the conductor or unlocking it therefrom.

4. A trolley provided with a plurality of wheels arranged in pairs lying at an angle to one another, said wheels being journaled in the arms of a frame and adapted to be locked upon a conductor, said frame having projections confronting the sides of the wheels to prevent spreading of the latter.

In testimony whereof I have hereunto subscribed my name this 18th day of August, A.D. 1897.

HENRY VAN HOEVENBERGH.

Witnesses:
  LILLIAN M. BRUCE,
  EMEROY B. CLIFFORD.